Oct. 15, 1940.   H. B. BIRT ET AL   2,217,786
EXPANDER FOR STORAGE BATTERIES
Filed Nov. 10, 1937
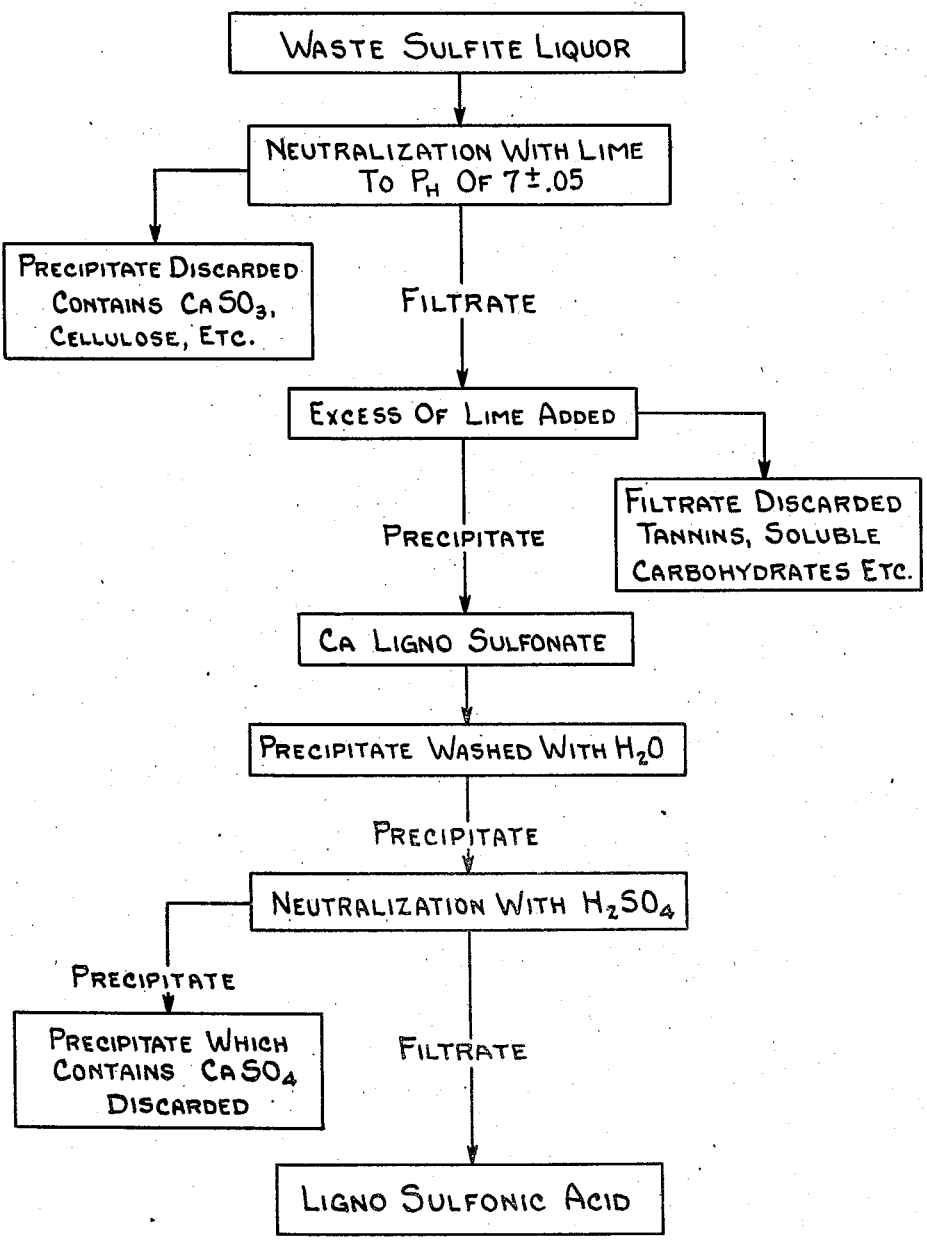
Howard B. Birt
William C. Pritchard
INVENTORS
BY
THEIR ATTORNEYS Patented Oct. 15, 1940

2,217,786

UNITED STATES PATENT OFFICE 2,217,786

EXPANDER FOR STORAGE BATTERIES

Howard B. Birt and William C. Pritchard, Muncie, Ind., assignors to General Motors Corporation, Detroit, Mich., a corporation of Delaware Application November 10, 1937, Serial No. 173,863

8 Claims. (Cl. 136—26)

This invention relates to the manufacture of storage batteries, and more particularly for storage batteries used in automotive vehicles.

It is an object of the invention to provide an improved expander for use with storage battery paste.

Certain organic materials referred to as expanders have been added to the negative paste of lead acid storage batteries to increase the capacity of the negative plate particularly at cold temperatures.

Waste sulfite liquor has been used as an expander. This liquor is obtained as a by product in the manufacture of pulp from spruce and other coniferous woods. This liquor according to the available literature contains many different organic materials. A few of these organic materials are lignosulfonic acid, carbohydrates, and tannins. Calcium is also present in the form of a water soluble salt.

We believe, as a result of investigation, that the active constituent of an organic expander derived from waste sulfite liquor is lignosulfonic acid and that the presence of these other organic materials or inorganic salts is unnecessary and in some instances detrimental to the negative plate.

More particularly this invention relates to the improvement of organic expanders derived from waste sulfite liquor by isolating the lignosulfonic acid from the heterogeneous mixture of organic materials found ordinarily in the liquor.

The lignosulfonic acid may be obtained from waste sulfite liquor in the following manner: The waste sulfite liquor which is discharged from the blow pits at the end of a calcium bisulfite treatment of the wood is neutralized by the addition of lime or magnesite to a pH of 7±.05. This neutralization process produces a precipitate of calcium sulfite. By filtering or allowing the solution to stand over night the precipitated calcium sulfite and any cellulose which passed through the screens in the blow pits are removed. To this neutralized solution is then added an excess of lime which precipitates the lignosulfonic acid as calcium lignosulfonate. This precipitate is removed from the solution by filtering. The filtrate contains most of the soluble carbohydrates and tannins which we have found to be unnecessary and in some instances detrimental to the negative plate. This filtrate is discarded. The precipitate of calcium lignosulfonate and the excess of lime is washed with water to remove any remaining carbohydrates and tannins. After the precipitate is thoroughly washed, a solution of sulfuric acid (about 1.400 specific gravity) is added in an amount required to neutralize the excess lime and precipitate the calcium in the calcium lignosulfonate as calcium sulfate. As a result of this procedure, the lignosulfonic acid which is soluble in the neutralized solution remains in solution and the calcium present is precipitated as calcium sulfate. The calcium sulfate is removed by filtration and discarded.

As a result of the above process lignosulfonic acid, which we have found to be the active constituent in producing negative plate expansion and negative plate capacity at low temperatures, is separated from the less desirable organic and inorganic materials. We have found that the addition of lignosulfonic acid to the negative paste in amounts up to 1% by weight proves very beneficial to the negative plate.

We have also found that the addition of an excess of litharge to the lignosulfonic acid solution produces a lead compound of lignosulphonic acid, a material which when dried and ground and then added to the negative paste in quantities equivalent to about 1% lignosulfonic acid by weight proves very beneficial to the negative plate. We believe at present that the material obtained from this operation is lead lignosulfonate.

What we claim is as follows:

1. A paste for storage battery plates including substantially pure lignosulfonic acid as an addition agent in amounts from 0.1% to 2.0% by weight, said paste being substantially free from calcium salts.

2. A paste for storage battery plates including as an addition agent a lead salt of substantially pure lignosulfonic acid in amounts from 0.3% to 6.0% by weight, said paste being substantially free from calcium salts.

3. As a step in the process of preparing an expander for the paste of storage battery plates, the addition of an excess of litharge to substantially pure lignosulfonic acid to produce a lead salt of lignosulfonic acid.

4. The process of preparing paste for the negative plates for storage batteries which consists in adding to the paste materials at the time they are being mixed, the reaction product of litharge and lignosulfonic acid, which has been purified and is substantially free from calcium salts.

5. A paste for storage battery plates including as an addition agent substantially pure lignosulfonic acid, said paste being substantially free from calcium salts.

6. A paste for storage battery plates including as an expander a lead salt of substantially pure lignosulfonic acid, said paste being substantially free from calcium salts.

7. The process of obtaining an expander comprising a lead salt of lignosulfonic acid for use in the paste of lead storage battery plates, comprising the steps of; neutralizing waste sulfite liquor by the addition of lime or magnesite whereby calcium sulfite is precipitated, adding to the filtrate an excess of lime whereby calcium lignosulfite is precipitated, treating the last mentioned precipitate by washing the same with water, adding sulfuric acid whereby the excess lime is neutralized and calcium sulfate is precipitated, leaving a filtrate of substantially pure lignosulfonic acid, and then adding excess litharge to the filtrate whereby the precipitate comprises a lead salt of substantially pure lignosulfonic acid which may be added to the plate paste of the storage battery plates.

8. A storage battery paste including as an addition agent, a substantially pure sulfonated lignin acid which is substantially free from calcium salts.

WILLIAM C. PRITCHARD.
HOWARD B. BIRT.